Oct. 11, 1955  G. D. GOWAN  2,720,372
SWIVEL ADAPTER FOR MOUNTING A CAMERA ON A TRIPOD
Filed May 22, 1953
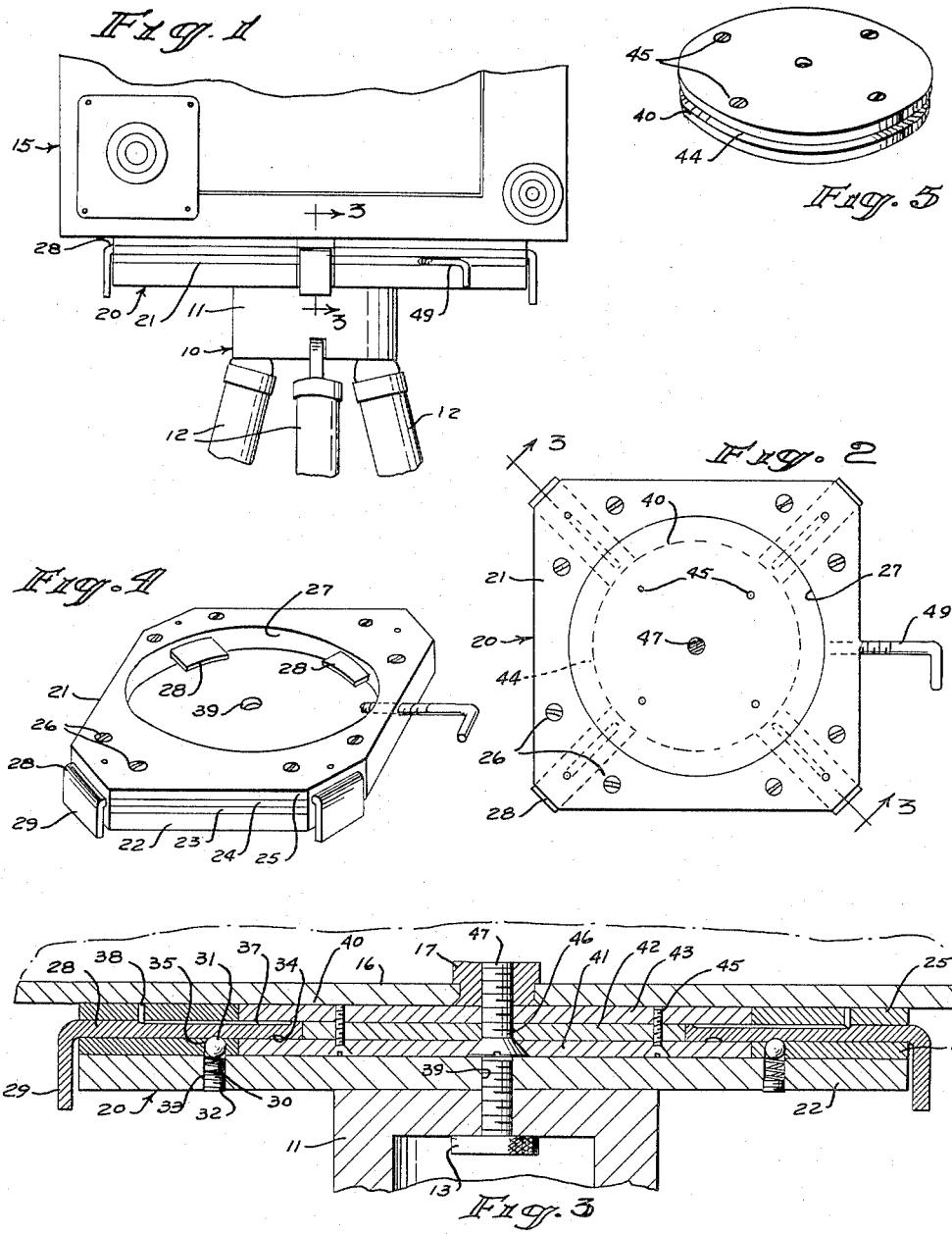
INVENTOR.
GORDON D. GOWAN
BY
McMorrow, Berman + Davidson
ATTORNEYS

United States Patent Office 2,720,372
Patented Oct. 11, 1955

2,720,372

SWIVEL ADAPTER FOR MOUNTING A CAMERA ON A TRIPOD

Gordon D. Gowan, Arcata, Calif.

Application May 22, 1953, Serial No. 356,619

2 Claims. (Cl. 248—186)

This invention relates to adapters for mounting cameras on tripods and more particularly to a quick detachable, swivel adapter permitting rotation of the camera relative to the tripod.

It is among the objects of the invention to provide an improved adapter for mounting a camera on a tripod and which includes separable parts one of which is rotatable relative to the other when the adapter is operatively assembled and one of which may be left permanently attached to the camera to provide a base for the camera, while the other may be left permanently attached to the tripod head; which includes quick releasable means detachably connecting the two parts of the adapter together, so that the camera can be quickly and easily mounted upon and removed from the tripod, when desired; which provides a solid mounting of the camera on the tripod while permitting rotational movements of the camera relative to the tripod; which includes lock means for holding the camera against rotational movements relative to the tripod; which is connected to the tripod by the usual camera attaching screw extending through the tripod head, and to the camera by a screw threaded into the tripod screw receiving insert in the bottom of the camera; and which is simple and durable in construction, economical to manufacture, easy to use, and neat and attractive in appearance.

Other objects and advantages will become apparent from a consideration of the following description and the appended claims in conjunction with the accompanying drawing wherein:

Figure 1 is a side elevational view of an adapter illustrative of the invention with fragmentary portions of an associated camera and camera tripod operatively connected thereto;

Figure 2 is a top plan view of the adapter;

Figure 3 is a cross sectional view on an enlarged scale on the line 3—3 of Figure 2;

Figure 4 is a perspective view of the portion of the adapter secured to the tripod; and Figure 5 is a perspective view of the portion of the adapter secured to the camera.

With continued reference to the drawing, the tripod, as generally indicated at 10, may be of any known or desired construction, and has a head 11 and three legs 12, pivotally connected at their upper ends to one end of the head 11 for supporting this tripod head at a desired level above the ground. The head 11 has a flat end opposite that to which the legs 12 are connected, and this end of the head is provided with a centrally located hole and a camera attaching screw 13 extends through this hole and is provided with an enlarged head at the side of the tripod head to which the tripod legs are attached. The camera, generally indicated at 15, may also be of any known or desired type, and has a bottom wall 16 provided with a centrally located hole in which is secured an internally screw threaded insert sleeve 17 for receiving the screw 47 when the camera is mounted on the tripod.

It frequently happens, particularly with large or heavy cameras, that it is difficult to center the insert sleeve 17 relative to the attaching screw 13 when mounting the camera on the tripod and an important amount of time is lost in getting the screw and the insert into alignment, so that the screw can be threaded into the insert. Even when the attaching screw has been threaded into the camera insert, the camera is still not freely rotatable on the tripod and rotational movements of the camera relative to the tripod head may loosen the screw and destroy the rigidity of the connection between the tripod and the camera.

In accordance with the present invention, an adapter, generally indicated at 20, is interposed between the tripod head and the bottom of the camera to facilitate mounting the camera upon and removing it from the tripod, and to provide a freely rotatable connection between the camera and the tripod when such a connection is desired, locking means being also provided to lock the camera rigidly to the tripod when this condition is desired.

The adapter comprises a composite base plate 21 of substantially square shape having its corners cut off to give the plate an irregular octagonal shape. The base plate 21 includes a flat bottom plate 22 and three annular plates 23, 24 and 25 superimposed on the bottom plate and secured in superimposed relationship to each other and to the bottom plate by screws 26 extending through registering apertures in the four plates, one near each corner of the octagonal structure. The three annular plates 23, 24 and 25 surround a centrally disposed recess 27 of circular shape, and the intermediate annular plate 24 is slotted at the smaller sides of the octagonal structure, so that this intermediate plate is actually provided in four separate pieces, and guideways of elongated, rectangular cross sectional shape are provided between the opposed edges of each two adjacent portions of this intermediate plate. These guideways extend from the edge of the recess 27 to the exterior of the composite base plate structure at the shorter sides of the edge of this structure radially of the recess and flat tongues, as indicated at 28, are slidably mounted, one in each of the guideways. Each tongue has its outer end portion perpendicularly disposed relative to the remainder of the tongue and extending somewhat beyond the side of the bottom plate 22 remote from the annular plates 23, 24 and 25, to provide a finger grip 29 for sliding the tongue in the corresponding guideway inwardly and outwardly relative to the recess 27.

The bottom plate 22 is provided with holes, as indicated at 30, disposed one within the area of each of the tongue receiving guideways and medially of the width of the corresponding guideway and the intermediate plate 23 is provided with holes registering with the corresponding holes in the bottom plate 22. Spring detents are mounted in the holes in the plates 22 and 23 and each comprises a detent ball 31 disposed in and projecting through the corresponding hole in the intermediate plate 23, a plug 32 threaded into the hole into the plate 22 at the side of this plate remote from the plate 23 and a compression spring 33 disposed in the corresponding hole in the plate 22 between the plug 32 and the ball 31. The holes in the plate 23 are restricted at the side of this plate remote from the plate 22, so that the balls will not pass entirely through the holes in the plate 23, such construction being well known in the art of spring or ball detents.

Each tongue is provided with recesses, as indicated at 34 and 35, spaced apart longitudinally of the tongue and provided in the side thereof adjacent the detent ball 31. The detent ball is selectively engageable in the ball receiving recesses in the corresponding tongue to releasably hold the tongue in either of two different positions, in one of which the inner end of the tongue projects inwardly a predetermined distance into the recess 27, and in the other of which the inner end of the tongue is substantially flush with the side surface of the recess.

Each tongue is also provided in its side remote from the bottom plate 22 with a longitudinally extending groove 37 terminating short of the respectively opposite ends of the tongue and the top plate 25 of the base plate structure is provided with pins, as indicated at 38, which extend through the plate 25, one over each of the tongues 28 and project at their lower ends into the corresponding grooves 37 to limit longitudinal movements of the tongues 28 in the corresponding guideways in the base plate structure.

The bottom plate 22 of the base plate structure is provided at the center of the recess 27 with a tapped hole 39 which receives the camera attaching screw 13 of the tripod for rigidly mounting the base plate structure 21 on the tripod head 11.

The adapter includes a disc structure 40 having a diameter substantially equal to the diameter of the recess 27 and a thickness substantially equal to the depth of this recess. The disc structure 40 is a composite structure including three circular plates 41, 42 and 43, disposed in mutually superposed and concentric relationship relative to each other. The plates are all of substantially the same thickness and the center or intermediate plate 42 has a diameter less than the diameter of the top and bottom plates 41 and 43, so that the disc is provided with a circumferential groove 44. The three plates are secured together by suitable means, such as the screws 45 extending through mutually registering apertures in the three plates, and the disc structure is provided at its center with a screw receiving aperture 46. The end of the aperture 46 at the outer side of the bottom plate 41 is countersunk and a screw 47 is extended through the aperture 46 and threaded into the camera insert 17 to rigidly secure the disc 40 to the bottom of the camera, the head of this screw being received in the countersink at the end of the aperture 46 remote from the bottom wall 16 of the associated camera.

The disc 40 has a diameter such that it constitutes a suitable base for the camera 15 and this disc may be left permanently attached to the camera by the screw 47. The base plate structure 21 may be left permanently attached to the tripod head by the screw 13 and the disc 40 may be removed from the base plate 20 by retracting all of the tongues 28 and lifting the camera and the disc attached thereto to remove the disc from the recess 27 in the base plate structure 21. To attach the camera to the tripod, the disc 40 on the camera is placed in the recess 27 in the base plate structure 21 mounted on the tripod and the tongues 28 are then forced inwardly until the inner ends of the tongues engage in the peripheral groove 44 in the disc and firmly secure the disc in the recess 27. The camera, with the attached disc 40, is now freely rotatable relative to the base plate structure 21 and the tripod 10 while being firmly held on the tripod. The tongues 28 have a thickness exactly equal to the thickness of the spacing elements 24 which provide the guideways for the tongues and to the width of the groove 44, so that they have a close fit in the corresponding guideways and in the groove and provide a solid connection between the base structure 21 and the disc 40 of the adapter.

The base plate structure 21 is provided with a tapped hole extending from the edge of the recess 27 to the edge surface of the structure 21 midway of the length of one of the longer sides of the base plate structure, and a set screw 49 is threaded through this tapped hole and is engageable at its inner end with the peripheral surface of the disc 40 to lock the disc against rotation relative to the base plate structure 21 and thereby hold the camera against rotational movements relative to the associated tripod.

The adapter is formed of a durable material of high structural strength, such as an aluminum alloy, and the parts are of sufficient size and thickness that the adapter will carry the heaviest cameras with an adequate factor of safety and provide a solid support for the camera while permitting free rotational movements of the associated camera, when desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In an adapter for mounting a camera on a tripod head, a plate adapted to be secured to a tripod head, said plate having a top and a circular recess opening through said top and an outer edge, said recess having a side wall, a disc rotatably engaged in said recess, said disc having a peripheral edge having a circumferential groove, a radially extending slot in said plate opening through the outer edge of the plate and through the side wall of the recess, and a tongue slidably fitting said slot, said tongue having an inner end reaching radially inwardly beyond the recess side wall and removably engaged in the circumferential groove in the peripheral edge of the disc, said tongue having an outer end, and means on said outer end for moving said tongue radially with respect to the disc from an inward disc groove engaging position to a withdrawn outward position in which the tongue is disengaged from the circumferential groove, said tongue having longitudinally spaced detent depressions therein, and a spring pressed detent fixed on said radial slot and releasably engageable in said detent depressions for retaining said tongue in inward and withdrawn positions.

2. In an adapter for mounting a camera on a tripod head, a plate adapted to be secured to a tripod head, said plate having a top and a circular recess opening through said top and an outer edge, said recess having a side wall, a disc rotatably engaged in said recess, said disc having a peripheral edge having a circumferential groove, a radially extending slot in said plate opening through the outer edge of the plate and through the side wall of the recess, and a tongue slidably fitting said slot, said tongue having an inner end reaching radially inwardly beyond the recess side wall and removably engaged in the circumferential groove in the peripheral edge of the disc, said tongue having an outer end, and means on said outer end for moving said tongue radially with respect to the disc from an inward disc groove engaging position to a withdrawn outward position in which the tongue is disengaged from the circumferential groove, said slot having a side wall, and said tongue having longitudinally spaced detent depressions, said side wall having an opening, and a spring detent mounted on said plate and projecting through said opening for releasably engaging in any one of said detent depressions.

References Cited in the file of this patent

UNITED STATES PATENTS

| 831,797 | Miller | Sept. 25, 1906 |
|---|---|---|
| 1,049,668 | Carlson et al. | Jan. 7, 1913 |
| 1,846,382 | Bing | Feb. 23, 1932 |
| 2,214,192 | Burnett | Sept. 10, 1940 |
| 2,280,162 | Rue | Apr. 21, 1942 |
| 2,459,040 | Miller | Jan. 11, 1949 |

FOREIGN PATENTS

| 12,001 | Great Britain | of 1890 |
|---|---|---|
| 362,568 | Germany | Oct. 30, 1922 |
| 842,521 | France | June 14, 1939 |